Patented Nov. 25, 1947

2,431,512

UNITED STATES PATENT OFFICE 2,431,512

WAXY STARCH GRANULES

Herman H. Schopmeyer, Hammond, Ind., assignor to American Maize-Products Company, a corporation of Maine No Drawing. Application March 31, 1943, Serial No. 481,373

3 Claims. (Cl. 127—32)

1

This invention relates to waxy starch granules and the method of making them. The invention relates, more particularly, to granules made from a cereal starch that are similar to grains found that granules resistant to disintegration on cooking as in the making of a tapioca-like pudding or other dessert.

In making these foods, the preferred selected starch granules are cooked with water to cause swelling and softening without disintegration. It has been considered necessary heretofore that in such dessert products including the starch in granular form after cooking must be made from some other than a cereal starch. Now we have found that granules resistant to disintegration on moderate cooking with water may be made from waxy maize starch, waxy sorghum starch, or other waxy starch which before modification gives a reddish brown color with iodine.

Waxy starch is more easily thinned on cooking as with acidified water than regular corn starch and less subject to setting of its aqueous gels on cooking. It is contrary to expectation, therefore, that waxy starch which has been gelatinized and formed into pellets or grains as described herein should remain intact and preserve its granular form satisfactorily on subsequent cooking, whereas regular corn starch processed in similar manner disintegrates on cooking.

Briefly stated, the invention comprises forming a moistened, more or less doughy mass of waxy starch and water, heating the mass on a heated supporting surface to a temperature at least equal to the pasting point of the starch but below the temperature of scorching or other objectionable decomposition of the starch, stirring the mass as it is pasted, and discontinuing the heating and subsequently cooling the product when the starch has been largely formed into pellets. In the preferred embodiment of the invention, the heating of the mass of starch is effected while the mass is in the form of a thin layer on a hot plate and the stirring is vigorous. In another embodiment, the invention includes admixing a small proportion of corn starch into the waxy starch. The admixture increases the rate of setting and firmness after setting of the pudding obtained by cooking the pelleted composition, the mixture giving a result superior to that obtained with each starch alone.

Granules made as described withstand without disintegration remoistening with water in usual proportion and then cooking for the moderate period of time that is conventional

2 in the making of "tapioca" desserts, so that the granules are satisfactory in making such desserts.

The proportion of water used in the original mixture of waxy starch and water that is to be heated should be adequate to form a workable plastic or dough-like mass without making the mixture so thin that it flows back together quickly after a stirrer is moved through it. Thus there may be used for this a mixture of 25 to 50 parts of water for 100 parts of the starch and water mixture. Preferably, however, the proportion of water is within the range of approximately 35 to 50 parts. Moisture contents of about 40% to 42% are particularly satisfactory.

The temperature of the hot plate may be varied somewhat with the length of the period of time that is to be allowed for heating on the hot plate. A range of temperature of the hot plate that is preferred for use is approximately 220° to 250° F., although temperatures of about 200° to 350° F. may be used to advantage. In any case, the temperature is so adjusted that the waxy starch is heated to the pasting point or not substantially below 160° F. but below the temperature of scorching of the starch.

In making the granules of the present product, the moist waxy starch mixture is applied in the form of a thin layer, say to a depth of about $\frac{1}{16}$ to $\frac{1}{4}$ inch, to the preheated and continuously heated hot plate. The mass on the hot plate is vigorously stirred until it is pasted and practically all of the mass is in the form of coherent pasted pellets. The mass is then removed from the hot plate, as by scraping, and dried as in a rotary or other dryer, to a moisture content of about 10% to 15%. If desired, the drying may be effected on the hot plate.

To prevent the resulting granules from becoming too fluid on cooking at the time of their use it is advantageous to incorporate into the waxy starch and water mixture originally used a small proportion of regular corn starch, say 2 to 20 parts and preferably about 5 to 10 parts of the corn starch to 100 parts of total weight of the regular and waxy starch. When such a mixture is treated as described, the presence of the regular corn starch accelerates the setting of the pasted mass into shape retaining granules that resist disintegration on cooking with water, as in making a tapioca-like dessert.

In place of the regular corn starch as the admixture to the waxy starch, there may be used other common starches as, for example, rice, or wheat starch, the selected starch for admixture being substituted pound for pound for the regular corn starch in the composition described above.

Instead of heating on a hot plate as described above, the waxy starch may be prepared and then shaped and dried. Thus the waxy starch may be steamed in a conveyor or other suitable apparatus at the pasting temperature, say 160° F. or so, and at a moisture content of about 30% to 50% until the starch is pasted. The resulting doughy mass, of about 35% to 45% moisture content, is then extruded and cut or otherwise shaped into small rather uniform tapioca-like pellets. These are then dried to make them ready for shipment or use.

It will be understood that it is intended to cover all changes and modifications of the example of the invention herein chosen for the purpose of illustration which do not constitute departures from the spirit and scope of the invention.

What I claim is:

1. In making a granular tapioca-like product adapted to retain the granular form on cooking with water to make a starch dessert, the method which comprises forming a mixture of regular corn-starch and waxy starch, containing 5 to 10 parts of regular corn starch for 100 parts total of the regular corn starch and waxy corn starch, with water in proportion to form a mass including about 35 to 50 parts of water to 100 of total wet starch, heating the mass on a hot plate maintained at a temperature of about 220° to 350° F., vigorously stirring the mass during the heating so that the pasted starch is agglomerated into pellets, and discontinuing the heating and cooling the product when practically all of the mass has assumed the form of pellets.

2. In making a granular tapioca-like product adapted to retain the granular form on cooking with water to make a starch dessert, the method which comprises moistening a mixture of waxy and regular corn starch, containing 2 to 20 parts of the regular corn starch to 100 parts total of the regular corn starch and waxy starch, with water in amount to form a workable plastic mass, heating the mass at least to the pasting temperature but below the temperature of scorching of the starch mixture, stirring the mass during the heating so that the pasted starch is agglomerated into pellets, and discontinuing the heating and then cooling the product when practically all of the mass has assumed the form of pellets, the regular corn starch serving when the pellets are cooked into a pudding to increase the rate of setting of the pudding on cooling and firmness of the pudding after setting.

3. An edible starch product comprising pellets of a pasted and solidified mixture of waxy starch and regular corn starch in the proportion of 2 to 20 parts of the regular corn starch to 100 parts of the regular corn starch and waxy starch, the pellets being resistant to disintegration on cooking and constituting a tapioca-like product, and the regular corn starch promoting the setting of the pellets to firm condition after pasting.

HERMAN H. SCHOPMEYER.

REFERENCES CITED

The following references are of record in the file of this patent:

FOREIGN PATENTS

| Number | Country | Date |
| --- | --- | --- |
| 165,248 | Great Britain | June 30, 1921 |

OTHER REFERENCES

Hixon and Sprague, "Waxy Starch of Maize and Other Cereals," Ind. & Chem. 34, 959–62 (1942), 1942 CA, vol. 36, page 6037.

Eynon and Lane, "Starch," Cambridge, 1928, pages 178 and 179. (Copy in Div. 43.)

Morgan, "Pasting and Identification of Starches," Ind. & Eng. Chem. Anal. Ed., vol 12, pages 313–317, 1940.

Chem. Trade J. and Chem. Engr., "A New Ind. Starch," Dec. 10, 1943, page 572.